(12) United States Patent
Welch

(10) Patent No.: US 9,427,684 B2
(45) Date of Patent: Aug. 30, 2016

(54) PORTABLE PRE-FILTERING FUEL FILLER DEVICE

(71) Applicant: Ford Global Technologies, LLC, Dearborn, MI (US)

(72) Inventor: Jeremy Welch, Warrandyte (AU)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 14/448,837

(22) Filed: Jul. 31, 2014

(65) Prior Publication Data

US 2016/0030863 A1 Feb. 4, 2016

(51) Int. Cl.
*B01D 35/00* (2006.01)
*B01D 27/14* (2006.01)
*B01D 36/00* (2006.01)
*B01D 17/04* (2006.01)
*F02M 37/22* (2006.01)
*B65D 25/42* (2006.01)
*B65D 25/40* (2006.01)

(52) U.S. Cl.
CPC ........... *B01D 35/005* (2013.01); *B01D 17/045* (2013.01); *B01D 27/148* (2013.01); *B01D 36/003* (2013.01); *F02M 37/22* (2013.01); *F02M 37/221* (2013.01); *B65D 25/40* (2013.01); *B65D 25/42* (2013.01)

(58) Field of Classification Search
CPC .. F02M 37/22; F02M 37/221; B01D 17/045; B01D 27/148; B01D 36/003; B65D 25/40; B65D 25/42; B65D 25/48
See application file for complete search history.

(56) References Cited

U.S. PATENT DOCUMENTS

| | | | |
|---|---|---|---|
| 3,415,384 A | 12/1968 | Kasten | |
| 4,296,723 A | 10/1981 | Aldrich | |
| 4,840,732 A * | 6/1989 | Rawlins | B01D 17/00 210/306 |
| 6,749,754 B1 | 6/2004 | Holder et al. | |
| 6,926,827 B2 | 8/2005 | Gruca et al. | |
| 7,704,383 B2 | 4/2010 | Zulauf et al. | |
| 2005/0109685 A1 | 5/2005 | Fujita et al. | |
| 2007/0125695 A1 * | 6/2007 | Pichler | B01D 35/301 210/314 |

(Continued)

FOREIGN PATENT DOCUMENTS

| | | | | |
|---|---|---|---|---|
| FR | 2601600 A1 * | 1/1988 | | B01D 17/0208 |
| JP | 5195560 B2 | 5/2013 | | |

(Continued)

OTHER PUBLICATIONS

ISA/RU: Federal Institute of Industrial Property, International Search Report and Written Opinion of PCT/US2015/034547, Sep. 24, 2015, WIPO, 7 pages.

*Primary Examiner* — Katherine Zalasky
*Assistant Examiner* — Benjamin Lebron
(74) *Attorney, Agent, or Firm* — James Dottavio; Alleman Hall McCoy Russell & Tuttle LLP

(57) ABSTRACT

A portable pre-filtering fuel filler device is described herein. The portable pre-filtering fuel filler device includes a fuel inlet opening, an interior fuel conduit in fluidic communication with the fuel inlet opening, and a water chamber positioned vertically below the interior fuel conduit. The portable pre-filtering fuel filler device further includes a fuel filter in fluidic communication with the water chamber and positioned vertically above the water chamber and a fuel outlet opening in fluidic communication with the fuel filter.

21 Claims, 4 Drawing Sheets

(56) References Cited

U.S. PATENT DOCUMENTS

2011/0215098 A1* 9/2011 Long ............... B67D 7/005
                                              220/62.18
2012/0312759 A1  12/2012 Ries et al.

FOREIGN PATENT DOCUMENTS

RU        2202478 C2   4/2003
WO     2012077048 A1   6/2012

* cited by examiner

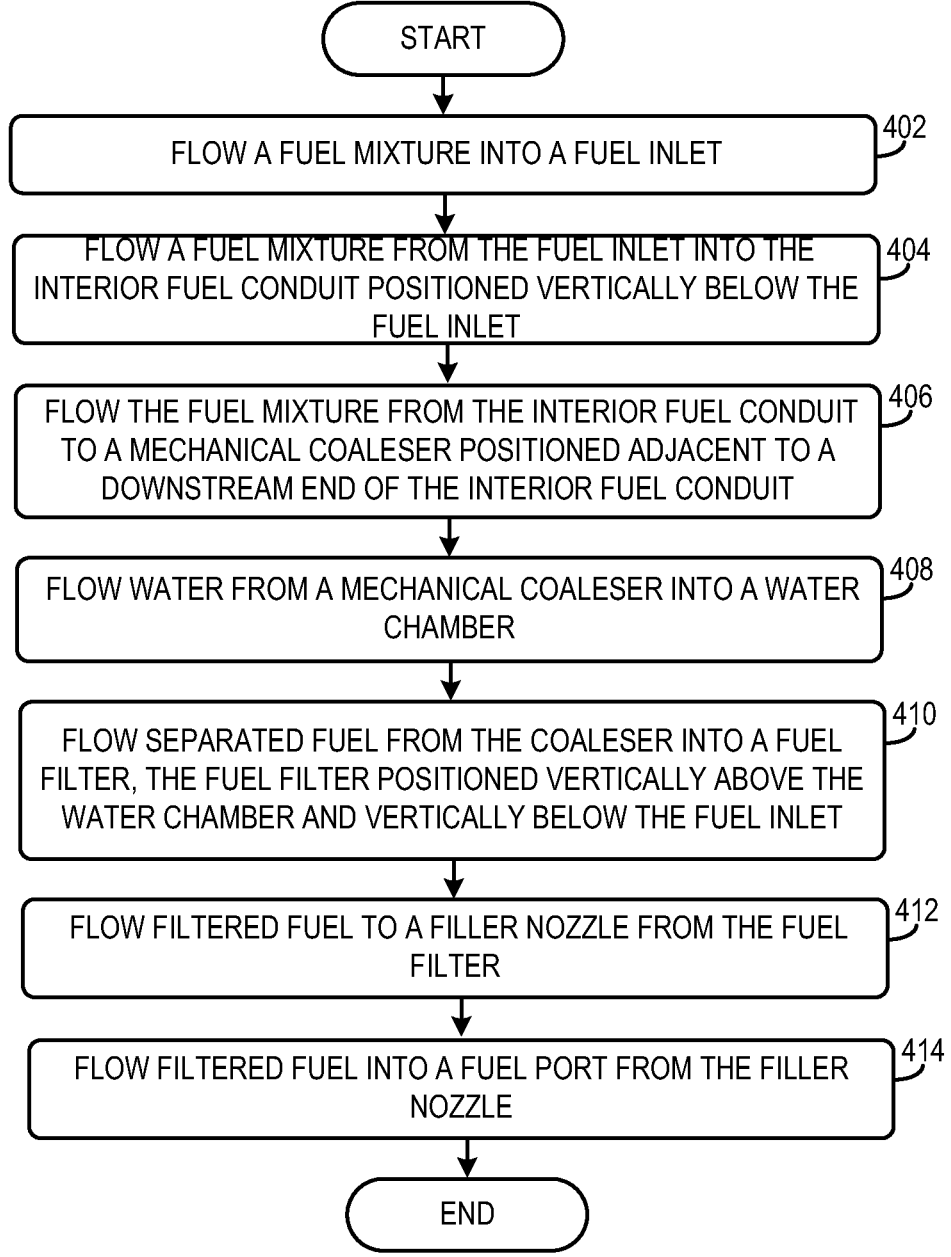

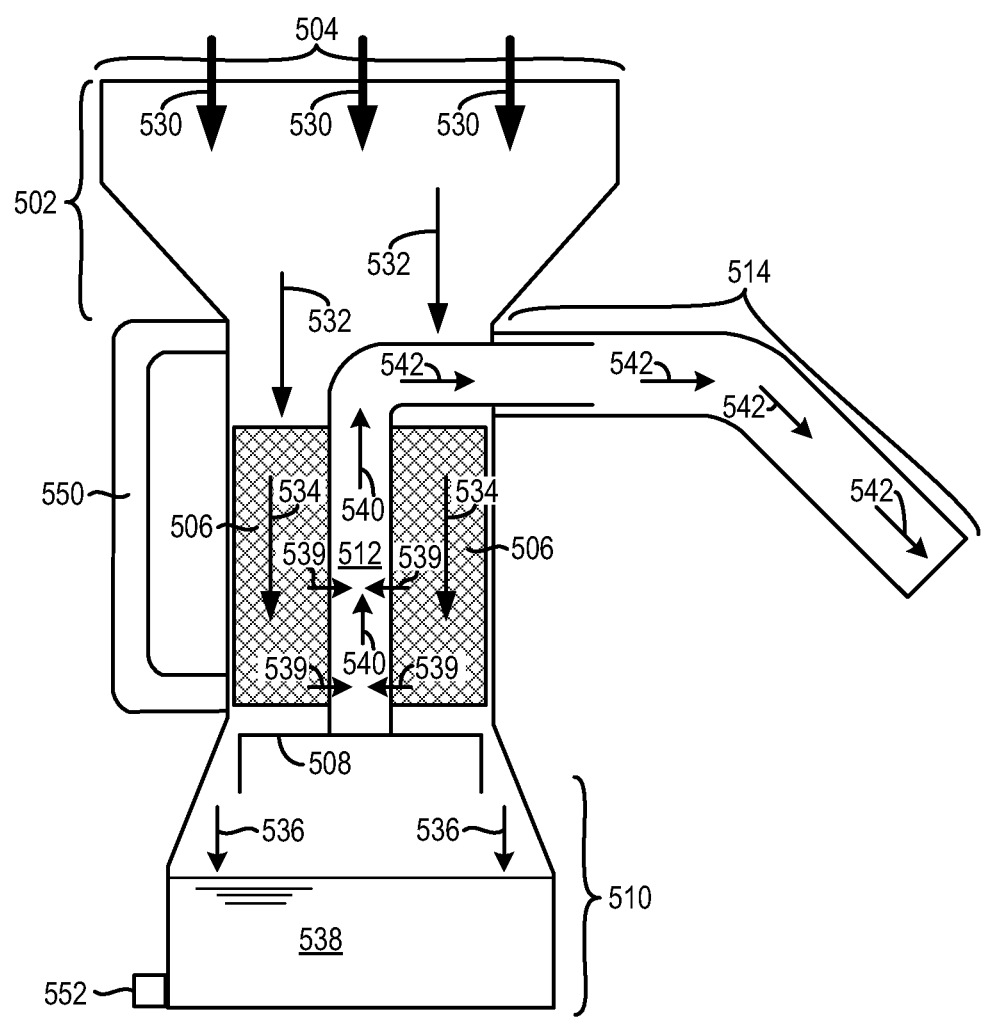

PORTABLE PRE-FILTERING FUEL FILLER DEVICE

FIELD

The present disclosure relates to a portable pre-filtering fuel filler device configured to remove water and other particulates from fuel prior to entry into a fuel system.

BACKGROUND AND SUMMARY

Fuels on the market such as diesel, biodiesel, gasoline, etc., may have varying degrees of quality due to the wide range of manufacturing standards in fuel processing around the globe. Therefore, fuel quality may vary based on location as well as other market factors. For instance, some fuels may not only contain a larger percentage of water but also contain debris, dirt, and/or other contaminants. The problem of fuel contamination may be particularly prevalent in less developed regions, such as Sub-Saharan Africa. Fuel contamination may decrease engine efficiency and increase emissions. Moreover, the fuel contamination may drastically decrease the lifespan of fuel injectors and fuel pumps in engines, necessitating early replacement of these parts. This fuel contamination may be particularly detrimental in engines using high pressure direct injection fuel delivery system employing high pressure fuel pumps, direct fuel injectors, etc. However, it will be appreciated that fuel contamination may lead to problems in numerous types of engines.

US 2012/0312759 discloses a fuel filter integrated into a fuel tank inlet. Specifically, the fuel filter is directly mounted to the fuel tank. The fuel filter is configured to remove particulates, such as dirt, from fuel entering the fuel tank. The Inventors have recognized several drawbacks with the fuel system disclosed in US 2012/0312759, as well as the issues noted above. For instance, the integrated fuel filter may be costly. Additionally, integrating the fuel filter into the fuel tank may also decrease the compactness of the fuel delivery system or decrease the capacity of the fuel tank. Furthermore, even if debris is removed, water in the fuel may decrease engine efficiency and increase emissions. At the same time, if a user has several vehicles, each vehicle must have an integrated filtering system, further increasing costs and maintenance.

As such in one approach, a portable pre-filtering fuel filler device is provided. The portable pre-filtering fuel filler device includes a fuel inlet opening, an interior fuel conduit in fluidic communication with the fuel inlet opening, and a water chamber positioned vertically below the interior fuel conduit. The portable pre-filtering fuel filler device further includes a fuel filter in fluidic communication with the water chamber and positioned vertically above the water chamber and a fuel outlet opening in fluidic communication with the fuel filter.

In one example, the water chamber enables water to collect at the bottom of the chamber and fuel to float on top of the water and be siphoned off to downstream elements. In this way, water can be separated from the fuel prior to fuel entering a fuel system such as a fuel system in a vehicle via the fuel port. Moreover, the filter also enables contaminants such as dirt, particulates, etc., to be removed from the fuel. Removing water and other contaminants from the fuel improves fuel quality. As a result, efficiency is increased and emissions are decreased in the engine accepting the higher quality fuel. Additionally, the component longevity in the fuel system of the engine is also increased when the portable pre-filtering fuel filler device is used to remove water and contaminants from the fuel entering the fuel system. Additionally, the cost of the device is less expensive than other filtering systems that directly integrate fuel filtering components into the fuel system. The device may be portable in that it may be shaped to be hand-held via a handle. Furthermore, the portability of the portable pre-filtering fuel filler device enables the device to be used to filter fuel in a multitude of engines and vehicles. For instance, the filler device can be used to filter fuel provided to multiple vehicles at a filling station, a home residence, etc. As a result, the applicability of the portable pre-filtering fuel filler device is increased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 4 shows a method for operation of a portable pre-filtering fuel filler device; and FIG. 5 shows an illustration of a second exemplary portable pre-filtering fuel filler device.

FIGS. 2 and 5 are drawn approximately to scale, although other relative dimensions may be used.

DETAILED DESCRIPTION

A portable pre-filtering fuel filler device described herein. The device is configured to separate water from the fuel and remove particulates from fuel prior to entering a fuel system, fuel canister, etc. Consequently, fuel quality is improved thereby improving engine operation in the engine utilizing the fuel. Furthermore, the portability of the device enables the device to be used to refill numerous engines, fuel canisters, etc., thereby increasing the applicability of the device. Additionally, it will be appreciated that when the pre-filtering device is implemented outside a fuel system of a vehicle, for example, the compactness of the fuel system can be increased and the cost of the fuel system can be decreased when compared to fuel systems having filtering devices integrated therein.

Figure 1:
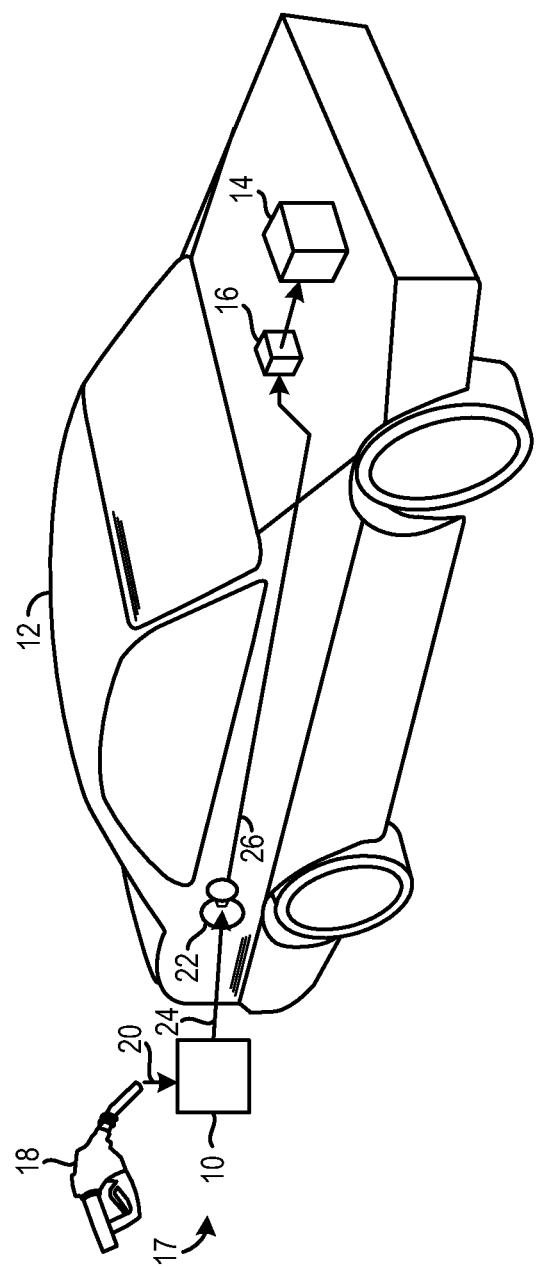
FIG. 1 shows an illustration of a portable pre-filtering fuel filler device and a vehicle accepting fuel from the portable pre-filtering fuel filler device through a fuel port.

FIG. 1 shows a schematic depiction of a portable pre-filtering fuel filler device 10 configured to provide filtered fuel to a vehicle 12 including an internal combustion engine 14 and fuel delivery system 16. The fuel delivery system 16 is configured to provide fuel to at least one cylinder in the engine. The fuel delivery system 16 may include pumps, fuel injectors, a fuel tank, etc. The portable pre-filtering fuel filler device 10 may be included in a system 17. The system 17 may further include the vehicle 12 having a vehicle fuel tank filling inlet 22 (e.g., fuel port) shaped to receive a portion of the portable device 10.

As shown, the pre-filtering fuel fuller device 10 receives fuel from a fuel nozzle 18. It will be appreciated that the fuel nozzle may be coupled to a fuel source, such as a fuel pump, fuel canister, etc. The flow of fuel from the fuel nozzle 18 to the portable pre-filtering fuel filler device 10 is denoted via arrow 20. Likewise, fuel flow from the portable pre-filtering fuel filler device 10 to the vehicle fuel tank filling inlet 22 in the vehicle 12 is denoted via arrow 24. Additionally, fuel flow from the vehicle fuel tank filling inlet 22 to the fuel delivery system 16 is denoted via arrow 26. Although the portable pre-filtering fuel filler device 10 is shown in the context of fuel refill for a vehicle, it will be appreciated that the portable pre-filtering fuel filler device may be used in numerous internal combustion engines utilizing fuel which may be contaminated. For instance, the portable pre-filtering fuel filler device may be used to filter fuel entering a generator, a portable fuel canister, aircraft, boat, etc.

Figure 2:
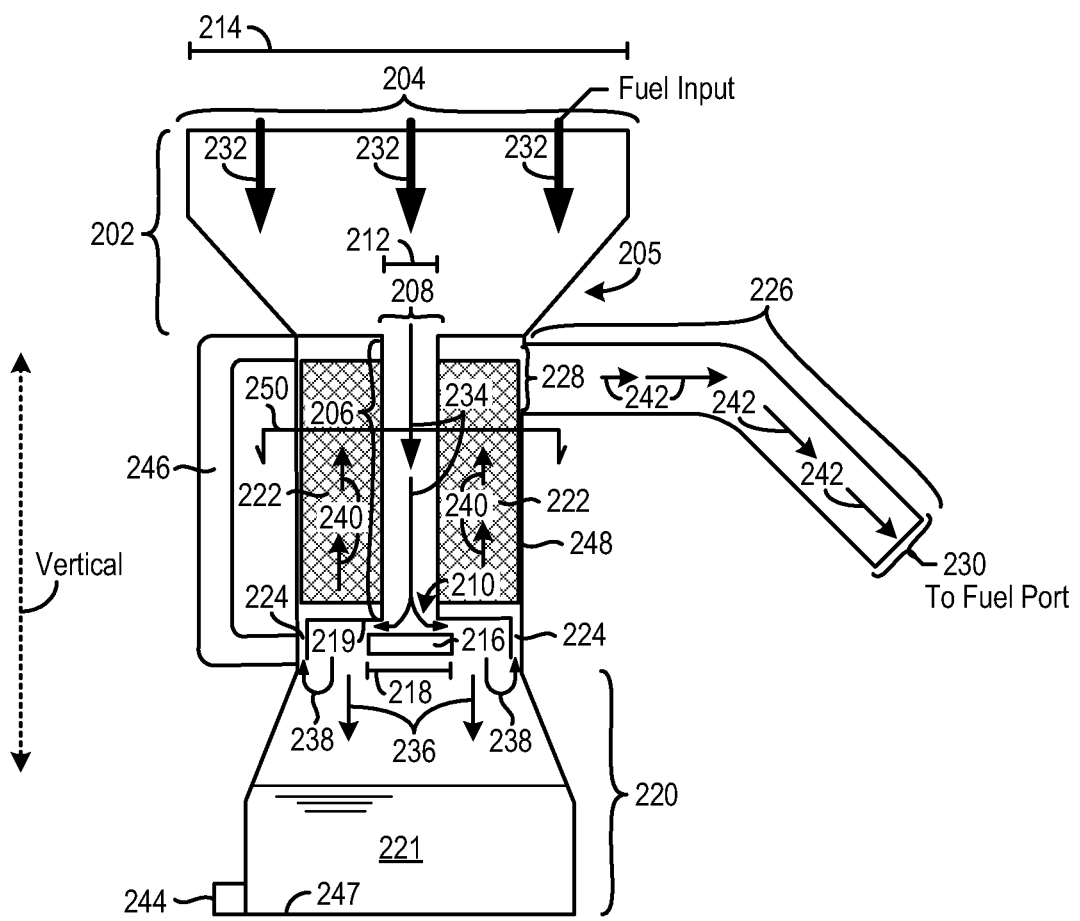
FIG. 2 shows an illustration of an exemplary portable pre-filtering fuel filler device.

The portable pre-filtering fuel filler device 10 is configured to remove water, particulates (e.g., dirt), and other contaminants from fuel flowing therethrough. Furthermore, the portable pre-filtering fuel filler device is transferable between engines (e.g., vehicle engines), thereby increasing the devices applicability. Numerous fuels have been contemplated including diesel, bio-diesel, gasoline, alcohol (e.g., ethanol, methanol, etc.), and/or mixtures thereof. It will be appreciated that the aforementioned fuels may be contaminated with water, particulates, etc. Therefore the fuels may be referred to as fuel mixtures. The portable pre-filtering fuel filler device 10 is schematically depicted via a box in FIG. 1. However, it will be appreciated that the portable pre-filtering fuel filler device 10 has additional structural complexity which enables the aforementioned functionality. A more detailed portable pre-filtering fuel filler device is shown in FIG. 2 and discussed in greater detail herein. The internal combustion engine 14 is configured to implemented combustion cycles (e.g., 2 stroke cycles, 4 stroke cycles, etc.).

FIG. 2 shows an illustration of an exemplary portable pre-filtering fuel filler device 200. It will be appreciated that the portable pre-filtering fuel filler device 200 shown in FIG. 2 is an example of the portable pre-filtering fuel filler device 10, shown in FIG. 1.

The portable pre-filtering fuel filler device 200 includes a fuel inlet 202 having a fuel inlet opening 204. The fuel inlet 202 is configured to receive fuel from a fuel nozzle (e.g., filling station nozzle) or other suitable fuel delivery apparatus. As shown, a portion 205 of the fuel inlet 202 tapers in a downstream direction. Specifically, the tapered section of the fuel inlet may be conical. Therefore, the likelihood of fuel spillage may be reduced. However, other fuel inlet geometries have been contemplated.

The portable pre-filtering fuel filler device 200 further includes an interior fuel conduit 206 in fluidic communication with the fuel inlet 202. As shown, the interior fuel conduit 206 is positioned downstream of the fuel inlet 202. Specifically in the depicted example, the interior fuel conduit 206 is positioned directly downstream of the fuel inlet 202. It will be appreciated that directly downstream as described herein is defined such that there are no intervening components between the two comparative elements. Therefore, the fuel inlet 202 is only in direct fluidic communication with the interior fuel conduit 206. Additionally, the fuel inlet 202 is only directly coupled to the interior fuel conduit 206, in the depicted example. However, other component arrangements have been contemplated. Additionally, the fuel inlet 202 is positioned vertically above the interior fuel conduit 206. A vertical axis is provided in FIG. 2 for reference. The interior fuel conduit 206 includes a first end 208 (e.g., upstream end) and a second end 210 (e.g., downstream end). A width 212 (e.g., radius) of the interior fuel conduit 206 is smaller than the width 214 of the fuel inlet opening 204. The width 212 of the interior fuel conduit is substantially constant alone the length of the conduit. Thus in one example, the interior fuel conduit 206 may be cylindrical in shape. However, other conduit shapes have been contemplated.

The portable pre-filtering fuel filler device 200 further includes a coaleser 216 positioned downstream (e.g., directly downstream) of the interior fuel conduit 206 and specifically the end 210 (e.g., downstream end) of the interior fuel conduit. The coaleser 216 is configured to aid in the removal of water from a fuel mixture flowing therethrough. Specifically, the coaleser 216 is configured to decrease the velocity of the fuel mixture enabling a layer of water to form below a layer of fuel in the water chamber. Therefore, a mixture of fuel and water flows from the coaleser into the water chamber. In the water chamber the fuel mixture separates into a layer of water positioned below a layer of fuel (e.g., gasoline, diesel, etc.,) due to their relative densities. The layer of fuel can then be siphoned into downstream components. In this way, water may be separated from the fuel flowing through the filler device. A width 218 of the coaleser 216 is greater than the width 212 of the interior fuel conduit 206. The coaleser 216 is positioned adjacent to an upper wall 219 of the water chamber 220 and the second end 210 of the interior fuel conduit 206, in the illustrate example. However, other coaleser positions have been contemplated. The coaleser may form a continuous shape (e.g., plate). In one example, the coaleser 216 may have a diameter between 200-250 millimeters (mm) or between 200-300 mm. However, other coaleser dimensions have been contemplated. The portable pre-filtering fuel filler device 200 may be at least partially constructed out of a plastic material such as polypropylene. The plastic material may be injection or vacuum formed. However, other materials and construction processes have been contemplated.

The portable pre-filtering fuel filler device 200 further includes the water chamber 220. The water chamber is 220 positioned vertically below the interior fuel conduit 206. The water chamber 220 is configured to collect water 221 separated from the fuel via the coaleser 216. It will be appreciated that the internal volume of the water chamber 220 may be greater than the internal volume of the interior fuel conduit 206. The water chamber 220 is only in direct fluidic communication with the interior fuel conduit 206 and the filter intake conduits 224, in the depicted example. Additionally, the water chamber 220 is not in direct fluidic communication with the fuel inlet 202, in the depicted example. Additionally, the water chamber 220 is only directly coupled to the filter intake conduits 224 and the interior fuel conduit 206. However, other devices arrangements have been contemplated.

The portable pre-filtering fuel filler device 200 further includes a fuel filter 222 in fluidic communication with the filter intake conduits 224. In the depicted examples, the fuel filter 222 is only in direct fluidic communication with the filter intake conduits 224 and the filler nozzle 226. Thus, the filler nozzle 226 is only directly coupled to the fuel filter 222, in the depicted example. The fuel filter 222 is not in direct fluidic communication with the fuel inlet 202, the interior fuel conduit 206, the water chamber 220, or filter intake conduits 224, in the depicted example. The fuel filter 222 is configured to remove particulates from the fuel flowing therethrough. Additionally, the fuel filter 222 may be configured to wick fuel in a vertical direction. In this way, the filter may assist in siphoning fuel from the water chamber to the fuel nozzle. As shown, the fuel filter 222 is positioned vertically above the water chamber 220 and vertically below the fuel inlet 202. Thus, the fuel filter 222 and the interior fuel conduit 206 are interposed between the fuel inlet 202 and the water chamber 220. Additionally, the fuel filter 222 surrounds (e.g., circumferentially surrounds) the interior fuel conduit 206, in the example depicted in FIG. 1. However, in other examples, the interior fuel conduit 206 may surround the fuel filter 222

Filter intake conduits 224 lead from the water chamber 220 to the fuel filter 222. However, in other examples the filter intake conduits 224 may be omitted from the filler device. The fuel filter 222 is in fluidic communication with the water chamber 220. Therefore, the fuel filter 222 is positioned downstream of the water chamber 220. Additionally, the fuel filter 222 is positioned vertically above the water chamber 220 and vertically below the fuel inlet 202.

The fuel filter 222 is configured to remove particulates (e.g., dirt, debris, etc.,) from the fuel flowing therethrough. The portable pre-filtering fuel filler device 200 further includes the filler nozzle 226 coupled to (e.g., directly coupled to) and in fluidic communication with the fuel filter 222. In this way, filtered fuel may be flowed to the filler nozzle 226. The filler nozzle 226 is only in direct fluidic communication with the fuel filter 222, in the depicted example. The filler nozzle 226 is not in direct fluidic communication with the water chamber 220, the fuel conduit 206, and the fuel inlet 202. The filler nozzle 226 may be configured to be inserted into a vehicle fuel tank filling inlet (e.g., fuel port) on a vehicle, a fuel canister, etc. The filler nozzle 226 includes an intake opening 228 (e.g., upstream end) and fuel outlet opening 230. The filler nozzle 226 tapers in a downstream direction, in the depicted example. Furthermore, the filler nozzle 226 is positioned vertically below the fuel inlet 202 and vertically above the water chamber 220. Additionally, the intake opening 228 of the filler nozzle 226 is positioned adjacent to an upper portion of the fuel filter 222 and is coupled (e.g., directly coupled) to the fuel filter 222. Thus, the intake opening 228 is in direct fluidic communication with the fuel filter 222. However, other filler nozzle arrangements have been contemplated.

Arrows 232 denote the flow of unfiltered fuel through the fuel inlet 202. In other words, contaminated fuel (e.g., dirty fuel) can be poured into the fuel inlet 202 (e.g., inlet funnel). This fuel input is indicated via arrows 232. Arrows 234 denote the flow of unfiltered fuel through the fuel conduit 206. Additionally, arrows 236 denote the flow of water into the water chamber 220 separated from the fuel via the coaleser 216. It will be appreciated that the fuel is agitated via the coaleser 216 which assists in the separation of water molecules from the fuel. Specifically, the coaleser enables water molecules to sink to a lower portion of the water tank 220. Fuel floating on top of the water collected in the lower portion of the water chamber 220 is then drawn through the fuel filter 222 which captures dirt, particulates, etc., in the fuel. Specifically, arrows 238 denote the flow of separated fuel into the filter intake conduits 224 from the coaleser. Arrows 240 denote the flow of separated fuel through the fuel filter 222. It will be appreciated that contaminants such as dirt, debris, etc., are removed from the fuel flowing through the fuel filter 222. Additionally, arrows 242 denote the flow of filtered and separated fuel through the filler nozzle 226. It will be appreciated that the filler nozzle 226 may be coupled to a vehicle fuel tank filling inlet and therefore filtered and separated fuel will flow through the filler nozzle into the vehicle fuel tank filling inlet in such an example. Thus, the clean fuel can then progress down the filler nozzle 226 and into a vehicle fuel tank, for example. It will be appreciated that the aforementioned arrows only depict a general direction of flow. However, the fuel flow in the device has greater complexity that is not depicted.

The portable pre-filtering fuel filler device 200 further includes a drain valve 244 coupled to the water chamber 220 and configured to permit and deny water flow (e.g., open and close) from the water chamber 220 to the external environment. Specifically, the drain valve 244 is positioned adjacent to a lower wall 247 of the water chamber 220. However, other drain valve positions have been contemplated. In this way, water can be removed from the device. The drain valve 244 may be configured to be passively or actively operated. The portable pre-filtering fuel filler device 200 further includes a handle 246 coupled to a housing 248 of the portable pre-filtering fuel filler device. The handle 246 enables a user to easily grasp the device during refilling operation, transport, etc. The housing 248 may enclose the fuel filter 222 and at least partially define boundaries of the inlets, conduits, chambers, etc., in the device. Furthermore, cutting plane 250 defines the cross-section shown in FIG. 3.

Figure 3:
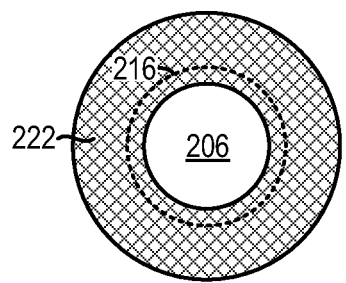
FIG. 3 shows a cross-sectional view of the portable pre-filtering fuel filler device shown in FIG. 2.

FIG. 3 shows a cross-sectional view of the portable pre-filtering fuel filler device 200, shown in FIG. 2. The fuel filter 222 is shown circumferentially enclosing the fuel conduit 206. The coaleser 216 is also shown in FIG. 3. A portion of the coaleser is obscured in the view and therefore the periphery of the coaleser is depicted via dashed lines. As shown, the width (e.g., radius) of the coaleser is greater than the width (e.g., radius) of the fuel conduit. The coaleser may have a disk shape, in one example. However, other coaleser shapes have been contemplated such as a square plate.

FIG. 4 shows a method 400 for operation of a portable pre-filtering fuel filler device. It will be appreciated that the portable pre-filtering fuel filler device discussed above with regard to FIGS. 1-3 may be used to implement the method. However in other examples other suitable filler devices may be used to implement method 400.

At 402 the method includes flowing a fuel mixture into a fuel inlet. Next at 404 the method includes flowing a fuel mixture from the fuel inlet into the interior fuel conduit positioned vertically below the fuel inlet. At 406 the method includes flowing the fuel mixture from the interior fuel conduit to a coaleser positioned adjacent to a downstream end of the interior fuel conduit. At 408 the method includes flowing water from a coaleser into a water chamber. At 410 the method includes flowing separated fuel from the coaleser into a fuel filter, the fuel filter positioned vertically above the water chamber and vertically below the fuel inlet. At 412 the method includes flowing filtered fuel to a filler nozzle from the fuel filter. As previously discussed, the filler nozzle may be positioned vertically below the fuel inlet and vertically above the water chamber. At 414 the method includes flowing filtered fuel into a fuel port from the filler nozzle.

FIG. 5 shows another example portable pre-filtering fuel filler device 500. It will be appreciated that the portable pre-filtering fuel filler device 500 shown in FIG. 5 is another example of the portable pre-filtering fuel filler device 10, shown in FIG. 1. The portable pre-filtering fuel filler device 500 includes some components which are similar to the portable pre-filtering fuel filler device 200, shown in FIG. 2.

Therefore it will be appreciated that some of the components in the portable pre-filtering fuel filler device 500 have similar structural and functional features to the components in the portable pre-filtering fuel filler device 200.

The portable pre-filtering fuel filler device 500 includes a fuel inlet 502 having a fuel inlet opening 504. Additionally, the portable pre-filtering fuel filler device 500 includes a fuel filter 506. The fuel filter 506 is in fluidic communication (e.g., direct fluidic communication) with the fuel inlet 502, a water chamber 510, and an interior fuel conduit 514. The pre-filtering fuel filler device 500 further includes a coaleser 508 positioned downstream of the fuel filter 506.

The pre-filtering fuel filler device 500 further includes a coaleser 508 configured to agitate the contaminated fuel to assists in the separation of water molecules from the fuel. Water from the fuel can flow into the water chamber 510 from the coaleser 508. The pre-filtering fuel filler device 500 further includes an interior fuel conduit 512. The interior fuel conduit 512 is in fluidic communication with the water chamber 510 and a fuel nozzle 514.

Arrows 530 denote the general flow of fuel into and through the fuel inlet 502. It will be appreciated that fuel flows from the fuel inlet 502 into the fuel filter 506. This flow is denoted via arrows 532. Subsequently, fuel flows through the fuel filter 506, denoted via arrows 534. Fuel then hits the coaleser 508. Water separated from the fuel is flowed into the water chamber 510, denoted via arrows 536. As shown, water 538 collects in a lower portion of the water chamber 510. Additionally, fuel from the fuel filter 506 flows into an interior fuel conduit 512, denoted via arrows 539. Thus, the fuel filter 506 is in fluidic communication (e.g., direct fluidic communication) with the interior fuel conduit 512. Arrows 540 denote the flow of filtered and separated fuel through the interior fuel conduit 512. The fuel then flows from the interior fuel conduit into the fuel nozzle 514. Fuel flow through the fuel nozzle is denoted via arrows 542. As previously discussed, fuel may then flow from the nozzle into a fuel port in a vehicle for example. The portable pre-filtering fuel filler device 500 further includes a handle 550 and a drain valve 552. It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A portable pre-filtering fuel filler device comprising:
 a fuel inlet opening;
 an interior fuel conduit in fluidic communication with the fuel inlet opening;
 a water chamber positioned vertically below the interior fuel conduit;
 a fuel filter in fluidic communication with the water chamber and positioned vertically above the water chamber;
 a fuel outlet opening in fluidic communication with the fuel filter;
 an upper wall physically coupled to a portion of the interior fuel conduit below the fuel filter, where the upper wall extends radially outward and downwardly from the interior fuel conduit toward the water chamber defining a fuel vapor flow path, and where the upper wall is located between the fuel filter and the water chamber with a bottom surface of the upper wall facing the water chamber and a coaleser and a top surface of the upper wall facing the fuel filter; and
 a gap located between side surfaces of the upper wall and a housing of the fuel filler device, where the side surfaces force fuel vapor to turn around before flowing to the fuel filter.

2. The portable pre-filtering fuel filler device of claim 1, where the fuel filter circumferentially surrounds the interior fuel conduit.

3. The portable pre-filtering fuel filler device of claim 1, wherein the coaleser is positioned directly downstream of an end of the interior fuel conduit and configured to separate water from a fuel mixture exiting the interior fuel conduit.

4. The portable pre-filtering fuel filler device of claim 3, where the coaleser is positioned adjacent to an upper wall of the water chamber.

5. The portable pre-filtering fuel filler device of claim 3, where a width of the coaleser is greater than a width of the interior fuel conduit and less than a width of the upper wall.

6. The portable pre-filtering fuel filler device of claim 1, where the fuel outlet opening is positioned vertically below the fuel inlet opening and vertically above the water chamber.

7. The portable pre-filtering fuel filler device of claim 1, where the fuel filter is positioned upstream of the interior fuel conduit and where the interior fuel conduit is in direct fluidic communication with the fuel outlet opening.

8. The portable pre-filtering fuel filler device of claim 1, further comprising a drain valve coupled to the water chamber.

9. The portable pre-filtering fuel filler device of claim 1, where the fuel outlet opening is included in a filler nozzle.

10. The portable pre-filtering fuel filler device of claim 9, where the filler nozzle tapers in a downstream direction.

11. The portable pre-filtering fuel filler device of claim 9, where the filler nozzle includes an intake opening in direct fluidic communication with the fuel filter.

12. A system comprising:
 a portable pre-filtering fuel filler device including:
  a fuel inlet opening;
  an interior fuel conduit positioned downstream of the fuel inlet opening;
  a coaleser positioned directly downstream of an end of the interior fuel conduit adjacent to a bottom surface of an upper wall;
  a water chamber positioned vertically below the interior fuel conduit;

a fuel filter positioned downstream of the interior fuel conduit and vertically above the water chamber;

the upper wall is physically coupled to a portion of the interior fuel conduit extending below the fuel filter, where the upper wall defines a flow path of the interior fuel conduit to the coaleser by being spaced away from the fuel filter and extending radially outward before extending downward to the water chamber, and where the upper wall is located between the fuel filter and water chamber, where the bottom surface of the upper wall faces the water chamber and the coaleser and a top surface of the upper wall faces the fuel filter, the upper wall further comprising side surfaces radially spaced away from a housing of the portable device; and a fuel outlet opening positioned downstream of the fuel filter; and a vehicle having a vehicle fuel tank filling inlet shaped to receive a portion of the portable device.

13. The system of claim 12, where the fuel outlet opening is positioned vertically below the fuel inlet opening and vertically above the water chamber.

14. The system of claim 12, where a width of the coaleser is greater than a width of the interior fuel conduit, and where the width of the coaleser is less than a width of the upper wall.

15. The system of claim 12, further comprising a drain valve coupled to the water chamber.

16. The system of claim 15, where the drain valve is adjacent to a lower wall of the water chamber.

17. The system of claim 12, where the coaleser is configured to separate water from a fuel mixture exiting the interior fuel conduit.

18. A portable pre-filtering fuel filler device comprising:
a fuel inlet opening;
an interior fuel conduit positioned directly downstream of the fuel inlet opening;
a coaleser positioned directly downstream of an end of the interior fuel conduit and configured to separate water from a fuel mixture exiting the interior fuel conduit;
a water chamber positioned vertically below the interior fuel conduit;
a fuel filter positioned downstream of the interior fuel conduit and vertically above the water chamber;
an upper wall spaced away from the fuel filter, the upper wall physically coupled to and extending radially outward from a portion of the interior fuel conduit vertically below the fuel filter, and where the upper wall extends downward toward the water chamber at a portion of the upper wall nearest to a housing of the portable device, the upper wall further comprising a bottom surface facing the water chamber and the coaleser, a top surface facing the fuel filter and the interior fuel conduit, and a side surface facing the housing, and where the housing is radially spaced away from the upper wall such that fuel vapor turns around before flowing to the fuel filter from the interior fuel conduit; and
a filler nozzle including a fuel outlet opening and positioned downstream of the fuel filter, vertically above the water chamber, and vertically below the fuel inlet opening.

19. The portable pre-filtering fuel filler device of claim 18, where the fuel filter circumferentially surrounds the interior fuel conduit.

20. The portable pre-filtering fuel filler device of claim 18, further comprising a drain valve coupled to the water chamber and a handle coupled to a housing enclosing the fuel filter.

21. The portable pre-filtering fuel filler device of claim 1, wherein the inner wall is annular and U-shaped, and is radially spaced away from the housing of the fuel filler device.

\* \* \* \* \*